US012794318B2

(12) United States Patent
Friedrich et al.

(10) Patent No.: US 12,794,318 B2
(45) Date of Patent: Nov. 10, 2026

(54) FLUID-COOLED ELECTRICAL MACHINE AND MOTOR VEHICLE

(71) Applicant: Vitesco Technologies GmbH, Regensburg (DE)

(72) Inventors: Fabian Friedrich, Berlin (DE); Lennart Leopold, Berlin (DE); Christoph Heukenroth, Berlin (DE); Ivan Krotow, Regensburg (DE); Dragan Stojkovic, Regensburg (DE); Günter Reitinger, Stamsried (DE); Olivier Frament, Zeitlarn (DE); Axel Burkhardt, Mühlhacker (DE)

(73) Assignee: Vitesco Technologies GmbH, Regensburg (DE)

( * ) Notice: Subject to any disclaimer, the term of this patent is extended or adjusted under 35 U.S.C. 154(b) by 225 days.

(21) Appl. No.: 18/632,339

(22) Filed: Apr. 11, 2024

(65) Prior Publication Data

US 2024/0364187 A1 Oct. 31, 2024

Related U.S. Application Data

(63) Continuation of application No. PCT/EP2022/073174, filed on Aug. 19, 2022.

(30) Foreign Application Priority Data

Oct. 15, 2021 (DE) ..................... 10 2021 211 688.4

(51) Int. Cl.

| | |
|---|---|
| ***H02K 9/19*** | (2006.01) |
| ***H02K 1/32*** | (2006.01) |
| ***H02K 7/00*** | (2006.01) |

(52) U.S. Cl.

CPC ............... *H02K 9/19* (2013.01); *H02K 7/003* (2013.01)

(58) Field of Classification Search

CPC ................................ H02K 9/19; H02K 7/003

(Continued)

(56) References Cited

U.S. PATENT DOCUMENTS 8,242,646 B2 * 8/2012 Tatematsu ................. B60L 7/14 310/60 A 8,970,074 B2 * 3/2015 Wagner .................. H02K 7/003 310/59

(Continued)

FOREIGN PATENT DOCUMENTS

CN 111555500 A 8/2020

DE 102004049795 A1 11/2005

(Continued)

OTHER PUBLICATIONS https://theconversation.com/heres-why-electric-cars-have-plenty-of-grunt-oomph-and-torque-115356 (Year: 2019).*

(Continued)

*Primary Examiner* — Burton S Mullins

(57) ABSTRACT

An electrical machine for a motor vehicle, having a rotor mounted rotatably about a rotational axis and has a hollow rotor shaft which encloses a shaft cavity, the hollow rotor shaft having an axial end with a shaft opening, a stationary lance guided through the shaft opening into the shaft cavity and has a fluid outlet opening, a cooling medium which is guided through the lance and sprayed via the fluid outlet opening onto an inner lateral surface of the hollow rotor shaft, an edge-sealed first outlet opening formed in a wall of the hollow rotor shaft, via which first outlet opening the cooling medium may escape from the shaft cavity, wherein, at a rotation speed n of the rotor of n≥4,000 rpm over at least 15 seconds, an average film thickness $d_F$ of the cooling medium in the radial direction of the rotor is ≤3 mm.

14 Claims, 3 Drawing Sheets

(58) Field of Classification Search
USPC ........................................................ 310/43, 54
See application file for complete search history.

(56) References Cited

U.S. PATENT DOCUMENTS

| | | | | |
|---|---|---|---|---|
| 10,734,866 | B2 * | 8/2020 | Yoshinori | H02K 1/32 |
| 2013/0038150 | A1 | 2/2013 | Chamberlin | |
| 2019/0312488 | A1 | 10/2019 | Latulipe | |
| 2022/0060072 | A1 * | 2/2022 | Michael | H02K 9/19 |

FOREIGN PATENT DOCUMENTS

| | | | |
|---|---|---|---|
| DE | 102015223073 | A1 | 5/2017 |
| DE | 102018221569 | A1 | 6/2020 |
| JP | 2012075244 | A | 4/2012 |
| JP | 2013132151 | A | 7/2013 |
| JP | 5765149 | B2 | 8/2015 |
| WO | 2018098567 | A1 | 6/2018 |

OTHER PUBLICATIONS

European Search Report dated Nov. 28, 2022 for corresponding European Patent Application No. PCT/EP2022/073174.
German Office Action dated Aug. 2, 2022 for corresponding German Patent Application No. 10 2021 211 688.4.

* cited by examiner

FLUID-COOLED ELECTRICAL MACHINE AND MOTOR VEHICLE

CROSS-REFERENCE TO RELATED APPLICATIONS

This application claims priority to PCT Application PCT/EP2022/073174, filed Aug. 19, 2022, which claims priority to German Patent Application No. DE 10 2021 211 688.4, filed Oct. 15, 2021. The disclosures of the above applications are incorporated herein by reference.

FIELD OF THE INVENTION

The invention relates to a fluid-cooled electrical machine for an at least partially electrically driven motor vehicle. The electrical machine has a rotor with a hollow rotor shaft into which a stationary lance projects. A coolant is sprayed onto an inner side of the hollow rotor shaft via the stationary lance and escapes from the hollow rotor shaft via a first outlet opening. An average film thickness of the cooling medium inside the hollow rotor shaft is ≤3 mm at a rotation speed n of ≥4,000 rpm for more than 15 seconds.

BACKGROUND OF THE INVENTION

Electrical machines for motor vehicles are generally known. The known electrical machines generally have a rotor, wherein the rotor can have a hollow shaft through which a cooling medium is guided. It is also known that these hollow shafts have an outlet via which the cooling medium introduced into the hollow rotor shaft can be sprayed directly onto the winding heads of a stator surrounding the rotor. The direct spraying of the winding heads with the cooling medium from the rotor shaft inevitably results in the outlet opening having a correspondingly small diameter, as a result of which the cooling medium remains in the rotor shaft for a correspondingly longer time and is therefore heated accordingly by the coolant build-up. As a result, the cooling capacity of the electrical machine is reduced, which can consequently reduce the performance of the electrical machine.

In order to achieve the required cooling capacity, a water-glycol mixture is preferably used as the cooling medium. However, this has the disadvantage that certain components in the electrical machine have to be sealed, which can result in additional costs.

SUMMARY OF THE INVENTION

It is an object of the invention to provide a liquid-cooled electrical machine which has an increased cooling effect and may be manufactured and/or provided at low cost.

This object is achieved by the subject described herein. Additional developments of the invention are the subject of the description which follows and the drawings. In this case, each feature may represent an aspect of the invention both individually and in combination, provided nothing to the contrary is explicitly stated in the description.

According to the invention, an electrical machine for a motor vehicle is provided, having a rotor which is mounted rotatably about a rotational axis and has a hollow rotor shaft which encloses a shaft cavity, the hollow rotor shaft having an axial end with a shaft opening, a stationary lance which is guided through the shaft opening into the shaft cavity and has a fluid outlet opening, a cooling medium which is guided through the lance and is sprayed via the fluid outlet opening onto an inner lateral surface of the hollow rotor shaft, an edge-sealed first outlet opening is formed in a wall of the hollow rotor shaft, via which first outlet opening the cooling medium escapes from the shaft cavity, wherein, at a rotation speed n of the rotor of n≥4,000 rpm over at least 15 seconds, an average film thickness $d_F$ of the cooling medium in the radial direction of the rotor is ≤3 mm.

In other words, according to the invention, an electrical machine is provided for a motor vehicle, such as for a traction drive of a motor vehicle. The electrical machine includes a rotor which is mounted so as to be rotatable about a rotational axis. The rotor includes a hollow rotor shaft which encloses a shaft cavity. A shaft opening is formed at one end of the hollow rotor shaft, which is formed in the axial direction of the rotor. A stationary lance is guided through the shaft opening into the shaft cavity. A cooling medium is also provided, which is guided through the lance. A fluid outlet opening is formed in the lance so that the cooling medium is sprayed through the fluid outlet opening onto an inner lateral surface of the hollow rotor shaft. The hollow rotor shaft is cooled effectively and in a targeted manner by directly wetting the inner lateral surface.

At least one edge-sealed first outlet opening is formed in one wall of the hollow rotor shaft. The first outlet opening thus connects the shaft cavity with an external area within the electrical machine. The cooling medium supplied to the shaft cavity is discharged from the shaft cavity via the first outlet opening. Furthermore, it is provided that at a rotation speed n of the rotor of n≥4,000 rpm over at least 15 seconds, an average film thickness $d_F$ of the cooling medium in the radial direction of the rotor is ≤3 mm. In other words, the average film thickness of the cooling medium is reduced during operation of the electrical machine. As a result, less cooling medium accumulates inside the shaft cavity, which increases the cooling effect of the electrical machine. In addition to the temperature-dependent viscosity of the cooling medium and the cross-sectional area of the outlet opening, the outflow of the cooling medium from the shaft cavity is largely determined by the rotation speed of the rotor, the incoming volume flow of the cooling medium and the internal diameter of the hollow rotor shaft.

The mean film thickness is the average film thickness over the length of the shaft cavity. It is conceivable that the film thickness in the area where the cooling medium meets the inside of the hollow rotor shaft is greater than in the edge area, where the first outlet opening is located.

In a development, the average film thickness at a rotation speed n of the rotor of 3,000≤n≤10,000 rpm is ≤3 mm, and may be ≤2 mm or for example ≤1 mm after at least 15 seconds, or after at least 10 seconds, or after less than 5 seconds. The smaller the film thickness, the greater the cooling effect of the electrical machine.

One development of the invention is that the cooling medium is an oil. This has the advantage that certain components within the electrical machine do not have to be encased or potted, as the risk of corrosion is reduced. It is therefore possible to reduce the costs for the electrical machine.

In a development of the invention, it is provided that a laminated core arranged on the hollow rotor shaft is seated non-rotatably over its entire surface on an outer side of the hollow rotor shaft. The full-surface contact of the inner side of the laminated core with the outer side of the hollow rotor shaft may be achieved by shrinking the laminated core onto the hollow rotor shaft. Alternatively, or in addition to this, it may be possible to cast a gap between the inner side of the laminated core and the outer side of the hollow rotor shaft.

The full-surface contact between the laminated core and the hollow rotor shaft increases the heat transfer between the laminated core and the hollow rotor shaft. Conversely, this may also result in greater cooling of the laminated core via the cooling medium sprayed onto the inner side of the hollow rotor shaft.

An embodiment of the invention provides that the cooling medium is sprayed onto the inner lateral surface of the hollow rotor shaft via the fluid outlet opening in the center, in relation to the length of the shaft cavity in the axial direction. Usually, the center of the rotor, in relation to the longitudinal direction of the rotor, is where the greatest heat is generated during operation of the electrical machine, so that this area should also be the first to be cooled. It is therefore intended that the cooling medium reaches the center of the inner lateral surface of the rotor via the fluid outlet opening, whereby the cooling effect of the electrical machine is increased. In this case, the center includes a deviation from the center in the axial direction of the rotor of up to 10%, such as of up to 5%, in relation to the length of the shaft cavity.

According to an embodiment of the invention, it is provided that a fluid distribution device is arranged directly or indirectly on the outer side of the hollow rotor shaft, by which at least a portion of the cooling medium discharged from the shaft cavity via the first outlet opening is received and sprayed onto a winding head of a stator surrounding the rotor. Accordingly, the fluid distribution device is designed to receive at least a portion of the cooling medium discharged from the shaft cavity via the first outlet opening and to spray it onto a winding head of a stator surrounding the rotor. The fluid distribution device thus makes it possible, among other things, to increase the cross-sectional area of the first outlet openings so that the cooling medium may flow out of the shaft cavity more quickly. The heat build-up in the shaft cavity is thus reduced, which means that more effective cooling of the rotor shaft is achieved. The cooling medium emerging from the first outlet opening is at least partially absorbed by the fluid distribution device and sprayed against the winding heads. This means that the stator is additionally cooled, which increases the overall cooling capacity of the electrical machine.

In principle, it is conceivable that the cooling medium discharged from the shaft cavity via the first outlet opening is fed indirectly into the fluid distribution device. This has the disadvantage that at least partially heated cooling medium from the hollow rotor shaft is additionally heated before it is fed to the other heat source, namely the winding heads.

A development of the invention is therefore that the cooling medium escaping from the first outlet opening is at least partially, an in an embodiment completely, absorbed directly by the fluid distribution device. The cooling medium discharged from the first outlet opening is thus fed immediately or directly to the fluid distribution device, so that it does not undergo any additional significant heating before it is fed to the winding heads. In this way, the cooling effect of the electrical machine is increased.

In an embodiment of the invention, it is provided that the fluid distribution device has an open reservoir with a fluid inlet opening and a second outlet opening. The cooling medium discharged from the first outlet opening is thus sprayed into the open reservoir via the fluid inlet opening. It is thus provided that a free section is formed between the first outlet opening and the fluid inlet opening of the reservoir. As the reservoir is an open reservoir, it may overflow when it is completely full, so that excess cooling medium is returned directly to the cooling circuit to cool the rotor. A winding head of the stator is at least partially sprayed with the cooling medium via the second outlet opening of the reservoir so that it may be cooled.

According to an embodiment of the invention, it is provided that the fluid distribution device is J-shaped and/or L-shaped in cross-section, wherein the long web is aligned perpendicular to the longitudinal axis of the rotor, the short web is aligned parallel to the longitudinal axis of the rotor and has the second outlet opening, and a projection is formed at the end of the short web and points in the direction of the longitudinal axis of the rotor. If a laminated core is arranged on the outer side of the rotor shaft and the laminated core has an end face in the axial direction of the rotor, the long web of the J-shaped or L-shaped fluid distribution device lies against the laminated core or is aligned perpendicular to the longitudinal direction and/or longitudinal axis of the rotor. The short web runs parallel to the longitudinal axis of the rotor and is arranged at a radial distance from the longitudinal axis. An outer side of the rotor formed in the radial direction is flush with an outer lateral surface of the laminated core. A projection pointing inwards in the radial direction is formed on the short web of the L-shaped fluid distributor. This geometric design makes it easy to create an open reservoir in the fluid distribution device to accommodate the cooling medium.

An embodiment of the invention is that the second outlet opening is aligned at an angle of between 0° and 30° in relation to a perpendicular of the rotational axis, wherein the limits are included. In other words, it may be provided that the second outlet opening is aligned at an angle of 90° to the longitudinal axis of the rotor. However, it is also conceivable that the second outlet opening is not aligned exactly perpendicular to the longitudinal axis. Depending on the design of the winding head and a width of the fluid distribution device, it may be provided that the outlet opening has an inclination starting from a perpendicular to the longitudinal direction of the rotor. This inclination may be up to 30° from the vertical. In other words, it is provided that the outlet opening is aligned by +/−5°, +/−10°, +/−15°, +/−20°, +/−25° or +/−30° in relation to a perpendicular to the longitudinal direction of the rotor. This allows the cooling medium exiting the second outlet opening to be sprayed in a targeted manner onto the stator winding, which increases the cooling of the winding head.

In an embodiment of the invention, it is provided that the fluid distribution device has a plurality of second outlet openings which are spaced apart from one another in the circumferential direction, wherein the second outlet openings have an outlet angle which is different from one another. In other words, it may be provided that a second outlet opening has an outlet angle of 0° in relation to the perpendicular to the longitudinal direction of the rotor. A further second outlet opening has an outlet angle of, for example, 10° in relation to the perpendicular to the longitudinal direction of the rotor. In this way, the winding head is sprayed and cooled via the various second outlet openings, where possible over its entire length in the axial direction of the stator.

An embodiment of the invention provides for an inner side of the fluid distribution device to be curved and/or concave in the region of the short web. The inner side of the fluid distribution device faces the rotational axis of the rotor at least in portions, such as in the region of the short web of the L-shaped or J-shaped fluid distribution device. In other words, the reservoir has a curved surface in cross-section. The second outlet opening is formed at the low point of the curvature. This means that the cooling medium taken up by the reservoir is fed directly and easily to the second outlet opening or escapes from the reservoir via the second outlet opening.

The first outlet opening is arranged and/or formed in the hollow rotor shaft in such a way that the cooling medium passes from the shaft cavity directly into the fluid distribution device and/or the open reservoir via the first outlet opening. In an embodiment, the first outlet opening is arranged at least at a distance from the long web of the L-shaped and/or J-shaped fluid distribution device. It a further embodiment the first outlet opening is arranged at a distance from the center of the hollow rotor shaft, in relation to the longitudinal direction of the rotor. In an embodiment, the first outlet opening is arranged at the height of the short web or the projection of the L-shaped or J-shaped fluid distribution device in the radial direction.

In a development of the invention, it is provided that the first outlet opening is aligned in the direction of the long web of the fluid distribution device, which is L-shaped and/or J-shaped in cross-section, and has an outlet angle $\alpha$ between $45°\leq\alpha<90°$, and in an embodiment is between $55°\leq\alpha<80°$, in relation to the longitudinal axis of the rotor. In other words, the first outlet opening is inclined, wherein the inclination is directed towards the laminated core. In this way, when the rotor rotates, the cooling medium emerging from the first outlet opening is directed into the reservoir via the long web.

In an embodiment of the invention, the fluid distribution device is formed in one piece with a thrust washer and/or end plate for pretensioning a laminated core arranged on the rotor. In other words, a laminated core is arranged non-rotatably on the outer side of the hollow rotor shaft. A thrust washer is formed on one end face of the laminated core in order to pretension the laminated core in the axial direction of the rotor, such as via tie rods guided through the laminated core and the thrust washer. The thrust washer is then designed as a fluid distribution device and therefore performs two functions, namely the introduction of force to pretension the laminated core and also the targeted distribution of coolant to cool the winding heads of the stator.

In a development of the invention, it is provided that the rotor is designed as an internal rotor and is surrounded by a stator via an air gap, wherein the stator has a stator winding designed with multiple layers in the radial direction of the stator, and a winding head is formed on an end face of the stator aligned in the axial direction, wherein a position of the multilayer stator winding in the region of the winding head between the end face of the stator and a distal end of the winding head is deflected in the radial direction and/or curved in relation to the longitudinal axis of the stator. In this way, a distance between two adjacent layers of the winding head is increased, into which the cooling medium sprayed onto the winding head may flow and cool the winding head. This increases the cooling effect of the stator and consequently also of the electrical machine.

An embodiment of the invention is that a winding head is formed without potting. In other words, the winding head is not completely encapsulated with a plastic. In this way, the winding head is cooled directly, and costs may also be reduced since work steps are eliminated.

The invention also relates to a motor vehicle having the electrical machine according to the invention.

The electrical machine is arranged and/or formed in the drive train of an at least partially, or fully, electrically powered motor vehicle.

Further features and advantages of the present invention will emerge from the following exemplary embodiments. The exemplary embodiments are to be understood not as restrictive, but rather as examples. They are intended to enable a person skilled in the art to implement the invention. The applicant reserves the right to make one and/or more of the features disclosed in the exemplary embodiments.

BRIEF DESCRIPTION OF THE DRAWINGS

The exemplary embodiments will be discussed in more detail with reference to drawings, in which.

DETAILED DESCRIPTION OF THE PREFERRED EMBODIMENTS

The following description of the preferred embodiment(s) is merely exemplary in nature and is in no way intended to limit the invention, its application, or uses.

Figure 1:
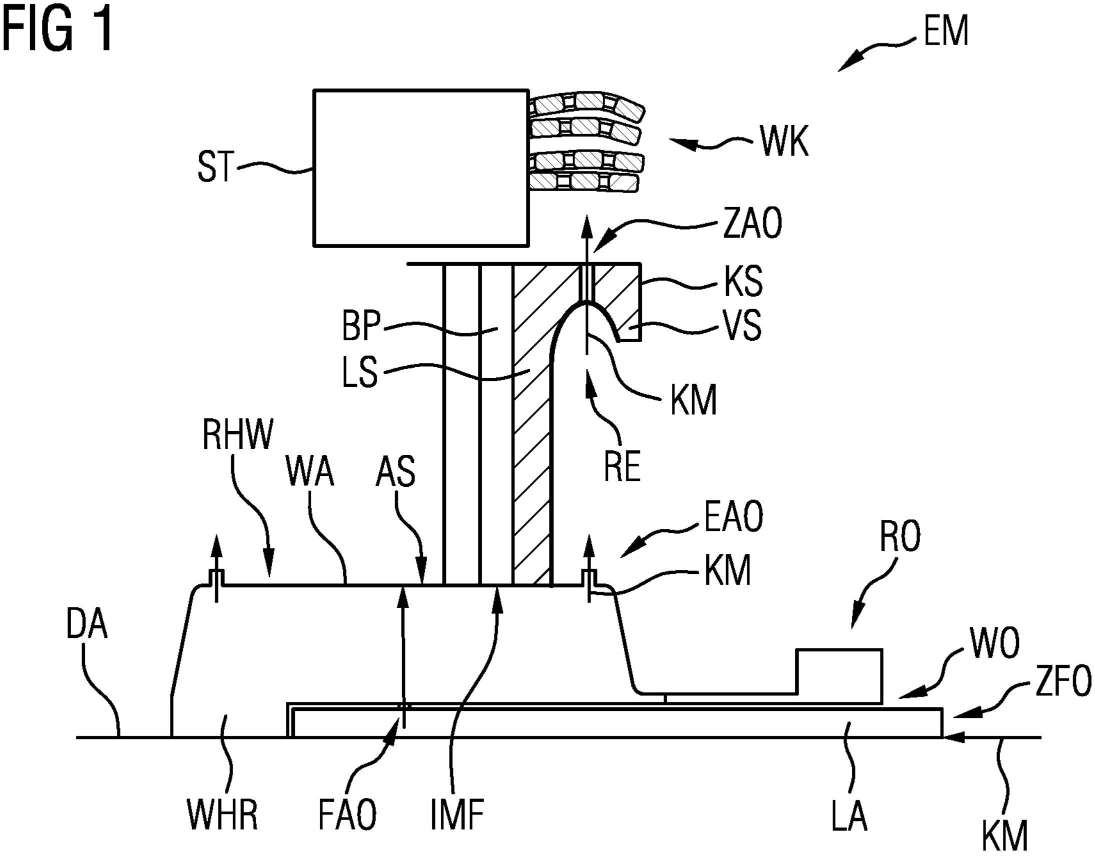
FIG. 1 shows a schematic representation of an electrical machine in longitudinal section, wherein only the upper half shown.

FIG. 1 shows a purely schematic representation of an electrical machine EM in a longitudinal section, wherein only the upper half is shown. The electrical machine EM has a rotor RO mounted about a rotational axis DA. The rotor RO includes a hollow rotor shaft RHW, which encloses a shaft cavity WHR. A shaft opening WO is formed at one end of the hollow rotor shaft RHW, which is formed in the axial direction of the rotor RO. A stationary lance LA is guided through the shaft opening WO into the shaft cavity WHR. The lance LA has a feed opening ZFO, so that a cooling medium KM is fed to the lance LA. In the present case, the cooling medium KM is an oil. A fluid outlet opening FAO is formed in the region of the lance LA that projects into the shaft cavity WHR. The fluid outlet opening FAO is designed and aligned in such a way that the cooling medium KM is sprayed directly onto an inner lateral surface IMF of the hollow rotor shaft RHW. The fluid outlet opening FAO is arranged in such a way that the cooling medium KM hits the inner lateral surface IMF of the hollow rotor shaft RHW in the center, in relation to the length of the shaft cavity WHR. By directly wetting the inner lateral surface IMF, the hollow rotor shaft RHW is cooled effectively and in a targeted manner.

At least one edge-sealed first outlet opening EAO is formed in a wall WA of the hollow rotor shaft RHW. The first outlet opening EAO thus connects the shaft cavity WHR with an outer area within the electrical machine EM. The cooling medium KM supplied to the shaft cavity WHR is discharged from the shaft cavity WHR via the first outlet opening EAO. In the present case, the first outlet opening EAO is aligned in a direction perpendicular to the longitudinal direction of the rotor RO.

The hollow rotor shaft RHW also has an outer side AS that faces outwards in the radial direction of the rotor RO. A laminated core BP is non-rotatably arranged on the outer side AS. A fluid distribution device FVE is arranged on an end face SS of the laminated core BP aligned in the axial direction of the rotor RO, which is set up to receive at least a portion of the cooling medium KM discharged from the shaft cavity WHR via the first outlet opening EAO and to spray it onto a winding head WK of a stator ST surrounding the rotor RO. The fluid distribution device FVE makes it possible to increase the cross-sectional area of the first outlet openings EAO so that the cooling medium KM may flow out of the shaft cavity WHR more quickly. The heat build-up in the shaft cavity WHR is thus reduced, which means that more effective cooling of the hollow rotor shaft RHW is achieved. Since the winding heads WK may no longer be sprayed due to the enlarged first outlet opening EAO, the cooling medium KM exiting the first outlet opening EAO is at least partially absorbed by the fluid distribution device FVE and sprayed against the winding heads WK. This means that the stator ST may also be cooled, which increases the overall cooling capacity of the electrical machine EM.

The fluid distribution device FVE is J-shaped and/or L-shaped in cross-section, wherein the long web LS is aligned perpendicular to the longitudinal axis of the rotor RO and rests against the end face SS of the laminated core BP. The short web KS is aligned parallel to the longitudinal axis of the rotor RO and has a second outlet opening ZAO, via which the coolant KM received by the fluid distribution device FVE is discharged to the winding head WK. A projection VS is formed at the end of the short web KS, which points in the direction of the longitudinal axis of the rotor RO. This geometric design makes it easy to create an open reservoir RE in the fluid distribution device FVE to accommodate the cooling medium KM.

Figure 2:
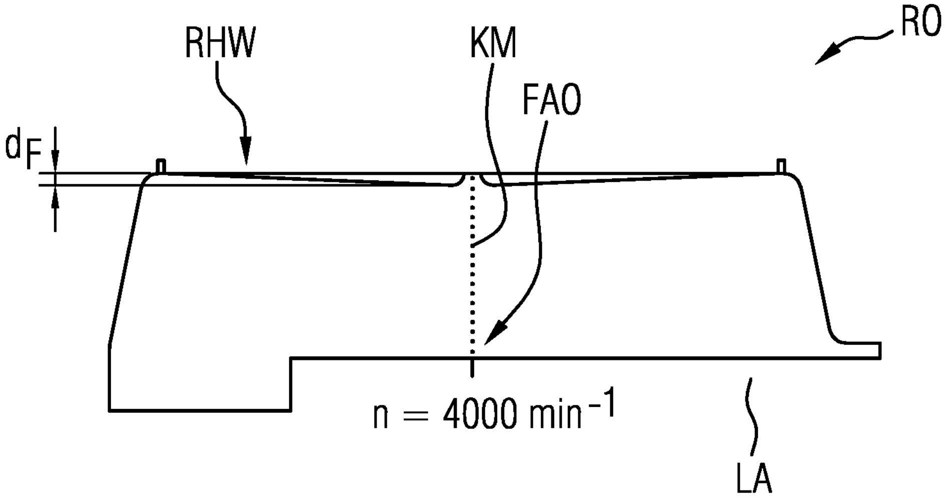
FIG. 2 shows an illustration of a film thickness of a cooling medium at a rotor speed of 4,000 rpm.

FIG. 2 shows a section through the hollow rotor shaft RHW, wherein the cooling medium KM emerges from the fluid outlet opening FAO formed in the lance LA and is sprayed against the inner lateral surface IMF of the hollow rotor shaft RHW. The rotor RO rotates at a speed n of 4,000 rpm, wherein the average film thickness $d_F$ of the cooling medium KM in the radial direction of the rotor RO, which is created on the inner lateral surface IMF $d_F$ during the rotation of the rotor RO about its rotational axis DA, is less than 3 mm. The cooling medium KM is removed from the shaft cavity WHR as quickly as possible so that it does not remain in the warm shaft cavity WHR for long.

Figure 3:
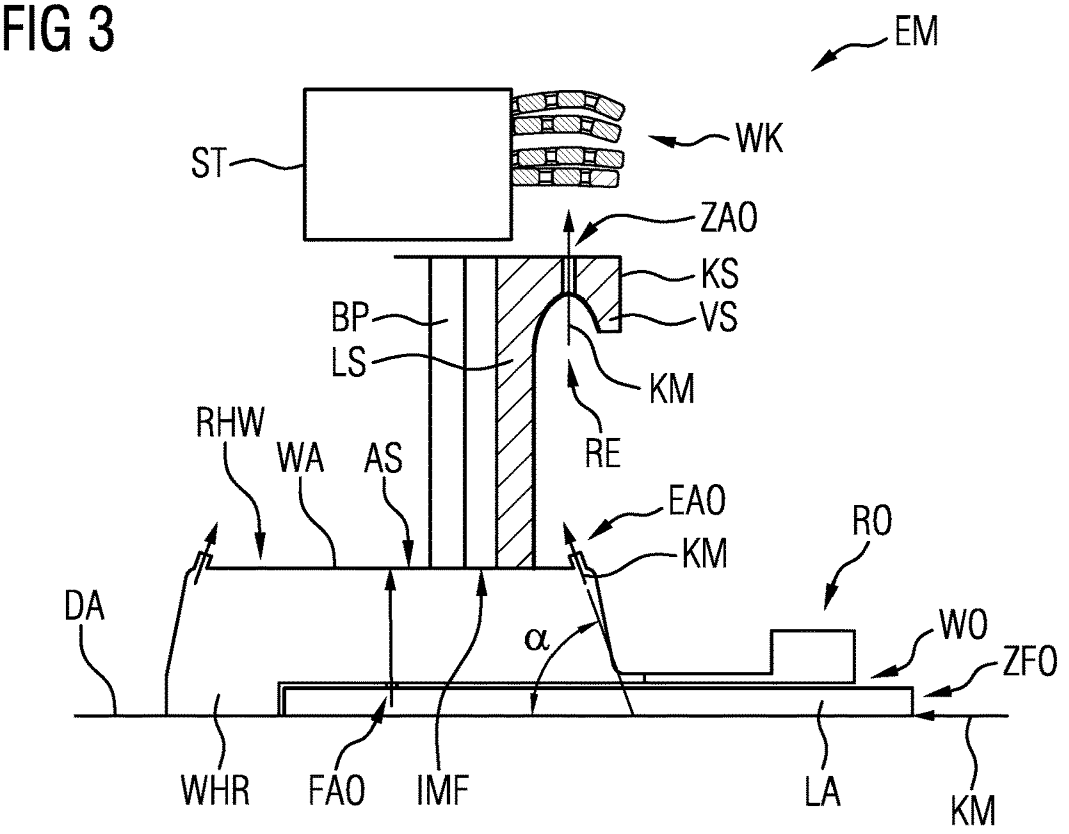
FIG. 3 shows a schematic representation of the electrical machine in longitudinal section, with inclined first outlet openings.

FIG. 3 shows the electrical machine EM known from FIG. 1, wherein the first outlet opening EAO is now aligned in the direction of the long web LS of the fluid distribution device FVE, which is L-shaped and/or J-shaped in cross-section, and has an outlet angle α of 70°, in relation to the longitudinal axis of the rotor RO. In other words, the first outlet opening ZAO is inclined, wherein the inclination is directed towards the laminated core BP. In this way, when the rotor RO rotates about its longitudinal axis, the cooling medium KM emerging from the first outlet opening EAO is directed into the reservoir RE via the long web LS.

Figure 4:
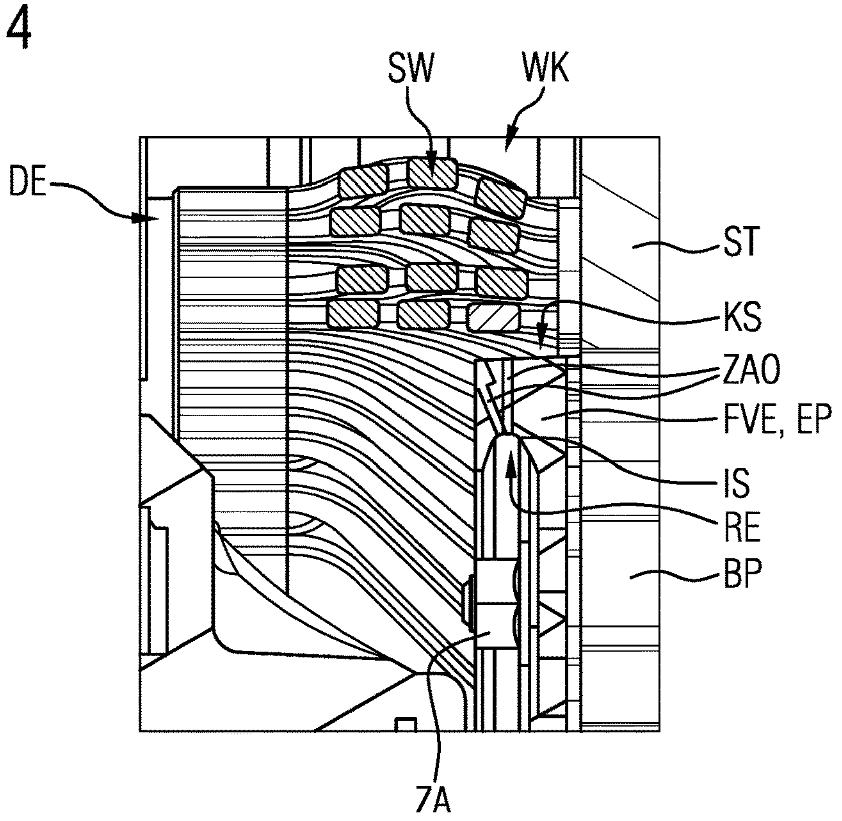
FIG. 4 shows a detailed view in the region of a fluid distribution device.

FIG. 4 shows a detailed view in the area of a fluid distribution device FVE, wherein the fluid distribution device FVE is formed in one piece with an end plate EP of the rotor RO in order to brace the laminated core BP in the axial direction of the rotor RO via tie rods ZA.

Furthermore, it may be seen that an inner side IS of the fluid distribution device FVW is curved and/or concave in the region of the short web KS, wherein the inner side IS of the fluid distribution device faces the rotational axis DA of the rotor RO at least in some portions, such as in the region of the short web KS. In other words, the reservoir RE has a curved surface in cross-section. The second outlet opening ZAO is formed at the low point of the curvature. This means that the cooling medium KM taken up by the reservoir RE is fed directly and easily to the second outlet opening ZAO or may escape via it.

As also seen in FIG. 4, a plurality of second outlet openings ZAO are provided. These may be arranged so as to be spaced apart from one another in the circumferential direction of the rotor RO. The various second outlet openings ZAO may be inclined differently or may have different outlet openings ZAO. In the present case, one of the second outlet openings ZAO is aligned perpendicular to the longitudinal axis of the rotor RO. Another second outlet opening ZAO is inclined by 15° to the perpendicular of the longitudinal axis of the rotor RO. Thus, the cooling medium KM exiting the second outlet opening ZAO is sprayed in a targeted manner over the entire length of the winding head WK in its axial direction, whereby the cooling of the winding head WK or the electrical machine EM is increased.

The stator ST has a multilayer stator winding SW, wherein one layer of the multilayer stator winding SW in the region of the winding head WK between the end face of the stator ST and a distal end DE of the winding head WK is deflected in the radial direction and/or curved in relation to the longitudinal axis of the stator ST. In this way, a distance between two adjacent layers of the winding head WK is increased, into which the cooling medium KM sprayed onto the winding head WK may flow and cool the winding head WK. In this way, the cooling effect of the stator ST and thus of the electrical machine EM may be increased.

Figure 5:
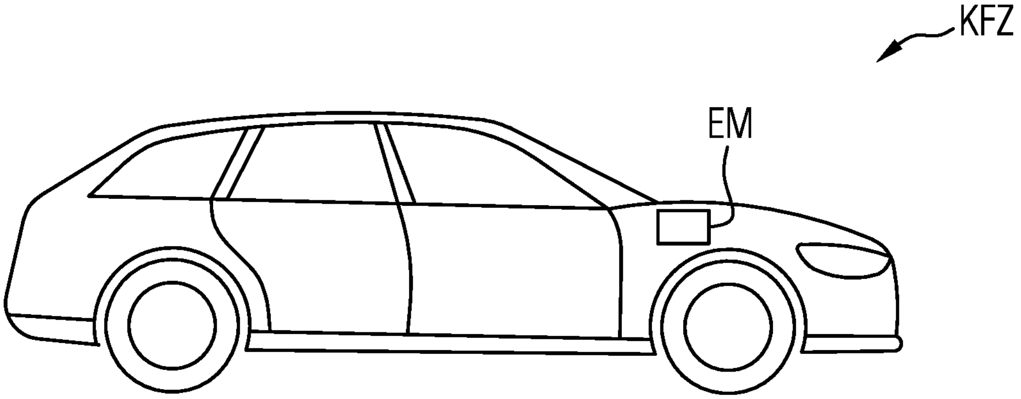
FIG. 5 shows a motor vehicle includes the electrical machine.

FIG. 5 shows a motor vehicle KFZ of the electrical machine EM. The electrical machine EM is located in the drive train of the motor vehicle KFZ and is set up and/or designed to drive the motor vehicle KFZ.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electrical machine for a motor vehicle, comprising:

a rotor mounted rotatably about a rotational axis, the rotor further comprising:
- a hollow rotor shaft having an inner lateral surface, and an axial end with a shaft opening; and
- a shaft cavity which is enclosed by the hollow rotor shaft;

a stationary lance, which is guided through the shaft opening into the shaft cavity, the stationary lance further comprising:
- a fluid outlet opening;

a cooling medium that is guided through the stationary lance and sprayed onto the inner lateral surface of the hollow rotor shaft via the fluid outlet opening;

an edge-sealed first outlet opening is formed in a wall of the hollow rotor shaft, via which edge-sealed first outlet opening the cooling medium may escape from the shaft cavity;

a fluid distribution device arranged on an outer side of the hollow rotor shaft, the fluid distribution device further comprising:
- an open reservoir having a fluid inlet opening and a second outlet opening;
- a long web which is aligned perpendicular to the longitudinal axis of the rotor;
- a short web connected to the long web, the short web aligned parallel to the longitudinal axis of the rotor, the second outlet opening being integrally formed as part of the short web; and a projection formed at the end of the short web, and points in the direction of the longitudinal axis of the rotor;

wherein at a rotation speed n of the rotor of n≥4,000 rpm over at least 15 seconds, an average film thickness $d_F$ of the cooling medium in the radial direction of the rotor is ≤3 mm, and via the fluid distribution device at least a portion of the cooling medium discharged from the shaft cavity via the first outlet opening is received and sprayed onto a winding head of a stator surrounding the rotor.

2. The electrical machine of claim 1, wherein the cooling medium is an oil.

3. The electrical machine of claim 1, further comprising:

a laminated core arranged on the hollow rotor shaft;

wherein the laminated core is seated non-rotatably over its entire surface on an outer side of the hollow rotor shaft.

4. The electrical machine of claim 3, wherein the fluid distribution device is formed in one piece with an end plate for pretensioning the laminated core arranged on the rotor.

5. The electrical machine of claim 1, wherein the cooling medium is sprayed onto the inner lateral surface centrally via the fluid outlet opening.

6. The electrical machine of claim 1, wherein the fluid distribution device is J-shaped and/or L-shaped in cross-section.

7. The electrical machine of claim 1, wherein an inner side of the fluid distribution device is curved and/or concave in the region of the short web.

8. The electrical machine of claim 1, wherein the first outlet opening is arranged at least spaced apart from the long web of the fluid distribution device.

9. The electrical machine of claim 1, wherein the first outlet opening is aligned in the direction of the long web of the fluid distribution device, and the first outlet opening has an outlet angle $\alpha$ between $45° \leq \alpha < 90°$, in relation to the longitudinal axis of the rotor.

10. The electrical machine of claim 1, wherein the second outlet opening is aligned at an angle of between 0° and 30° in relation to a perpendicular of the rotational axis.

11. The electrical machine of claim 1, the fluid distribution device further comprising:

a plurality of second outlet openings which are arranged so as to be spaced apart from one another in the circumferential direction of the rotor;

wherein second outlet openings have a different outlet angle from one another.

12. The electrical machine of claim 1, wherein the rotor further comprises an internal rotor surrounded by a stator via an air gap, the stator further comprising:

a multilayer stator winding designed with multiple layers in the radial direction of the stator; and a winding head formed on an end face of the stator aligned in the axial direction;

wherein a position of the multilayer stator winding in the region of the winding head between the end face of the stator and a distal end of the winding head is deflected in the radial direction and/or curved in relation to the longitudinal axis of the stator.

13. The electrical machine of claim 12, wherein the winding head is formed without potting.

14. A motor vehicle comprising an electrical machine of claim 1.

* * * * *